(12) United States Patent
Frebourg (10) Patent No.: US 11,034,615 B2
(45) Date of Patent: Jun. 15, 2021

(54) METHOD FOR ASSEMBLING LAMINATED GLAZING COMPRISING AN OVERMOULDED COMPONENT

(71) Applicant: SAINT-GOBAIN GLASS FRANCE, Courbevoie (FR)

(72) Inventor: Philippe Frebourg, Senlis (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 16/096,971

(22) PCT Filed: Apr. 24, 2017

(86) PCT No.: PCT/FR2017/050969
§ 371 (c)(1),
(2) Date: Oct. 26, 2018

(87) PCT Pub. No.: WO2017/187075
PCT Pub. Date: Nov. 2, 2017

(65) Prior Publication Data
US 2019/0077704 A1 Mar. 14, 2019

(30) Foreign Application Priority Data

Apr. 27, 2016 (FR) .................................. 1653743

(51) Int. Cl.
*C03C 27/06* (2006.01)
*B32B 17/10* (2006.01)
(Continued)

(52) U.S. Cl.
CPC ........ *C03C 27/06* (2013.01); *B32B 17/10036* (2013.01); *B32B 17/10541* (2013.01);
(Continued)

(58) Field of Classification Search
CPC .............. C03C 27/06; B32B 17/10045; B32B 17/10293; B32B 17/10036
See application file for complete search history.

(56) References Cited

U.S. PATENT DOCUMENTS

| | | | | |
|---|---|---|---|---|
| 3,881,043 A | * | 4/1975 | Rieser | ............... B32B 17/10018 428/81 |
| 2013/0021803 A1 | * | 1/2013 | Pickard | ..................... F21V 7/24 362/308 |
| 2015/0283797 A1 | | 10/2015 | Hennion et al. | |

FOREIGN PATENT DOCUMENTS

| | | |
|---|---|---|
| DE | 10 2007 012571 A1 | 1/2008 |
| WO | WO 2004/009349 A1 | 1/2004 |
| WO | WO 2014/057224 A1 | 4/2014 |

OTHER PUBLICATIONS

International Search Report as issued in International Patent Application No. PCT/FR2017/050969, dated Jul. 28, 2017.

* cited by examiner

*Primary Examiner* — Philip C Tucker
*Assistant Examiner* — John Blades
(74) *Attorney, Agent, or Firm* — Pillsbury Winthrop Shaw Pittman LLP (57) ABSTRACT

A process for assembling a laminated glazing includes placing an overmolded component in the interior of a window cut in a sheet of adhesive; spot bonding the overmolded component and the precut sheet of adhesive to a first glass sheet in the vicinity of the window in order that the sidewalls thereof and of the overmolded component remain contiguous; spot bonding the sheet of adhesive and a second glass sheet; and assembling the laminated glazing by implementing suitable temperatures and pressures in a conventional way.

10 Claims, 9 Drawing Sheets

(51) Int. Cl.
  *B60Q 1/26* (2006.01)
  *B60Q 1/00* (2006.01)
  *B32B 37/18* (2006.01)
(52) U.S. Cl.
  CPC ...... *B32B 17/10761* (2013.01); *B60Q 1/0094* (2013.01); *B60Q 1/268* (2013.01); *B32B 37/182* (2013.01); *B32B 2307/412* (2013.01); *B32B 2307/416* (2013.01); *B32B 2551/08* (2013.01); *B32B 2605/00* (2013.01)

METHOD FOR ASSEMBLING LAMINATED GLAZING COMPRISING AN OVERMOULDED COMPONENT

CROSS-REFERENCE TO RELATED APPLICATIONS

This application is the U.S. National Stage of PCT/FR2017/050969, filed Apr. 24, 2017, which in turn claims priority to French patent application number 1653743 filed Apr. 27, 2016. The content of these applications are incorporated herein by reference in their entireties.

The present invention relates to the field of curved and laminated glazings for automotive applications inter alia, and wherein it is desired to integrate components into the sheet of interlayer adhesive (such as polyvinyl butyral -PVB-) itself sandwiched between two glass sheets.

At the present time, glassmakers find it very difficult to integrate components having a significant thickness and a significant area, i.e. typically a thickness larger than 0.2 mm and lateral dimensions larger than 5 mm.

Specifically, such a component placed directly between the glass sheets will create an additional volume. Moreover, it is known that in the assembly and autoclaving process, PVB is unable to easily flow over distances larger than a few millimeters. Furthermore, the additional volume occupied by the component will result in the glazing being thicker locally and will lead to deformation of the interior and exterior glass sheets of the product. Therefore, various undesirable effects may arise:

- excessive deformation of the two glass sheets may induce excessively high local tensile stresses and cause one of them to break;
- bubbling may occur around the component inserted into the glazing, due to a low local pressure in the PVB; this low pressure is due to the deformation of the glazing by the volume of the component and to the free volume around the latter being only partially filled because of an imperfect flow of the PVB during the assembly and autoclaving operations; this lack of PVB material or this low partial pressure in the material promotes the formation of bubbles via degassing of small molecules present in the PVB;
- optical quality in transmission may be severely affected; specifically, when a sufficient PVB flow is achieved (or indeed, equivalently, if the volume of the component is sufficiently small) breakage and bubbling are avoided; in contrast, the local extra thickness level with the component remains, this deforming the exterior and interior faces of the glazing locally; a refractive optical interface therefore forms, which induces a substantial optical distortion that is very disaccommodating for the occupants of the vehicle;
- lastly, the local extra thickness may also result in the glazing having a lower optical quality in reflection; this criterion, which depends on the position of the deformation in the glazing and on the position of the observer, is perhaps relatively easy to identify.

There are many examples of components suitable for being inserted into a laminated motor-vehicle glazing. We have chosen two thereof by way of illustration:

The first consists of a set of three diodes (such as a set of one red, one orange and one blue diode) that are inserted under the bottom screen-printed strip of the glazing. The functionality that has been imagined for these diodes is to turn on depending on various driving conditions. The screen-print contains three disk-shaped apertures in order to let the light emitted by the diodes pass easily. The diodes and their control electronics are borne by a thin flexible printed circuit (FPC). The diodes, their control electronics and the FPC are connected to a cable strip equipped with a connector at its end. The assembly made up of the FPC and cable strip is hidden from the driver's sight by an enamel layer deposited on face 4 of the glazing (by convention, as is known, face 4 is that face of a windshield, for example, which makes contact with the passenger compartment of a transportation vehicle, face 1 being the face making contact with the exterior atmosphere, faces 2 and 3 being the interior glass faces of the laminate, numbered in order). The assembly made up of the diodes, FPC and cable strip is hidden from the sight of an exterior observer by an enamel layer deposited on face 2 of the glazing.

The second component is a relatively thick and shielded cable that allows a video camera, located in the interior of the passenger compartment behind the rearview mirror, to be connected to its processor located in another location of the passenger compartment of the vehicle. In order to be more discreet, the cable is run through the interior of the laminated product and passes through a hole drilled in the interior glass of the glazing. The cable is equipped with a connector in order to facilitate its connection during the assembly of the vehicle. As in the case of diodes, the cable is hidden from occupants of the vehicle by an enamel deposition on face 4 and from the sight of an exterior observer by an enamel deposition on face 2. This type of product is described in documents WO2014057224 (A1) and US2015283797 (A1).

Components are usually manufactured to be as thin as possible in order to limit the effect of the volume taken up locally by the PVB+component assembly. This is the case in document US2015283797 (A1) which describes a product having a conductor embedded in PVB: it is respectively mentioned that 1) the conductors take the form of a ribbon containing a plurality of conductors, 2) that this ribbon has a thickness comprised between 0.05 mm and 1 mm, and 3) that preferably this conductor has a thickness comprised between 0.08 mm and 0.5 mm.

Components having a thickness larger than about 0.2 mm are usually not assembled.

When the components are thicker, one known technique is to make a plurality of cutouts with PVB sheets of various thicknesses in order to obtain a PVB+component assembly that ensures that the glazing has a relatively constant thickness over all its area.

One difficulty is due to the fact that the abutment of the various pieces of PVB sheets must be precise and without gap because otherwise small bubbles may appear (due to local lack of material) after autoclaving.

Two other difficulties are due to the fact that such an assembly essentially implements two PVB sheets: 1) the cost is higher, and 2) because the number of interfaces is doubled, the probability of a visual defect being created because of dust or a fiber getting trapped is doubled, this being a serious problem for products of high added value.

As was seen above, it is the low capacity of the PVB to flow over large distances that is responsible for most of the adverse consequences of inserting a thick component into the thickness of a laminated glazing.

Other interlayers are sometimes used, such as interlayers of ethylene vinyl acrylate (EVA) or of polyurethane (PU), which have better flow properties but have the drawback of resisting poorly motor-vehicle standards or indeed of being expensive.

As indicated above, the main drawbacks of the lamination of components into a laminated glazing are:

1) breakage of one of the two glass sheets subsequent to excessive deformation of the latter;
2) bubbling around the component inserted into the glazing, due to a low local pressure in the PVB as a result of insufficient flow of the polymer during the assembly and autoclaving steps;
3) an optical quality in transmission that is very affected around the component due to the deformation of the two glass sheets in the vicinity of the component; and
4) a degradation of the optical quality in reflection of the glazing in the vicinity of the component.

Therefore, and in order to obtain viable products, it is usual to limit choice to components of small thickness, such as for example is the case with the cable strip of patent US2015283797 (A1).

Lastly, the process for assembling components of small thickness necessarily involves cutting and assembling sheets of different thicknesses in order to attempt to achieve an 'interlayer PVB+component' system of relatively constant thickness. These cutting and stacking operations are difficult to master and are poorly suited to industrial products. Many defects in quality result.

A remedy for these drawbacks is now possible with the invention, one subject of which is, consequently, a process for assembling a laminated glazing comprising an overmolded component, characterized in that it comprises operations that consist in preparing a main sheet of interlayer adhesive by precutting therein a window intended to receive the overmolded component;
presenting a first sheet of clean glass;
putting the precut sheet of adhesive in place on the first glass sheet and centering the sheet of adhesive with respect to the latter;
putting the overmolded component in place in the interior of the window cut in the sheet of adhesive, or conversely first putting the overmolded component in place, then the precut sheet of adhesive on the first glass sheet;
spot bonding the overmolded component and the precut sheet of adhesive to the first glass sheet in the vicinity of the window in order that the sidewalls a) of the window cut in the sheet of adhesive and b) of the overmolded component remain contiguous i.e. in good contact with each other;
putting a second clean glass sheet in place above the assembly made up of the first glass sheet, the sheet of adhesive and the overmolded component, the latter two being fastened by the spot bonds to the first glass sheet;
optionally spot bonding the assembly thus obtained in order that its various elements remain securely fastened to one another during the rest of the process;
removing the excess adhesive from around the glazing by trimming with a knife for example, unless this operation was performed when a window was precut in the sheet of adhesive; and
assembling the laminated glazing by implementing suitable temperatures and pressures in a conventional way.

The term "overmolded" here means "covered", "encapsulated" or "embedded", without presumption as to the technique employed to produce the overmolded component. Various techniques are mentioned below.

According to preferred features of the process of the invention:

the glazing is curved, and the first glass sheet is an interior sheet and presented with its convex surface directed upwards; the second glass sheet being an exterior sheet;
the glazing is curved, and the first glass sheet is an exterior sheet and presented with its concave surface directed upwards; the second glass sheet being an interior sheet;
the overmolded component is manufactured by pressing the component between two sheets of interlayer adhesive in a mold equipped with heating means;
the overmolded component is manufactured by extruding a first sheet of interlayer adhesive, placing the component on the latter and extruding a second sheet of interlayer adhesive onto the component;
the overmolded component is manufactured by injection molding interlayer adhesive around the component; each of the three techniques of pressing, extrusion and injection molding may be employed alone or in any combination with one of or both of the other techniques;
the main sheet of interlayer adhesive and the overmolding of the overmolded component comprise an acoustic lamination interlayer; the latter includes a softer core layer of higher plasticizer content, or at the very least an alternation of relatively soft and relatively hard layers, and that procure the property of insulation from noise;
all or some of the area of the main sheet of interlayer adhesive and of the overmolding of the overmolded component is tinted.

Other subjects of the invention consist of:

a laminated glazing comprising an overmolded component obtained using the process described above, characterized in that the component is a set of diodes and its control electronics, which are borne by a thin flexible printed circuit (FPC) and connected to a cable strip equipped with a connector at its end; preferably, the laminated glazing then includes two glass sheets, the assembly made up of the flexible printed circuit and the cable strip is hidden from the interior side of the glazing by an enamel layer deposited on face 4 of the glazing and containing apertures facing each diode in order to let pass the light emitted thereby, and the assembly made up of the diodes, the flexible printed circuit and the cable strip is hidden from the exterior side of the glazing by an enamel layer deposited on face 2 of the glazing;
a laminated glazing comprising an overmolded component obtained using the process described above, characterized in that the component is a relatively thick and shielded cable that allows a video camera, located in the interior of the passenger compartment of a transportation vehicle, in particular behind an interior rear-view mirror, to be connected to its processor located in another location of the passenger compartment of the vehicle, in that the cable is run through the interior of the laminated product and passes through a hole drilled in the interior glass sheet of the glazing, and in that the cable is equipped with a connector in order to facilitate its connection during the assembly of the vehicle; preferably, the cable is then hidden from the interior side of the glazing by an enamel deposition on face 4 of the glazing and from the exterior side of the glazing by an enamel deposition on face 2 of the glazing.

Yet another subject of the invention is the use of a laminated glazing comprising an overmolded component obtained using the process described above, as a glazing in a land, water or air transportation vehicle, in the construction industry, in urban furniture, or in interior design and in particular as a motor-vehicle windshield, side window, quarter window or rear windshield.

The invention will be better understood in light of the following description of the appended drawings, in which:

FIGS. 8a-i illustrate the various steps of the process of the invention; and

Figure 1A:
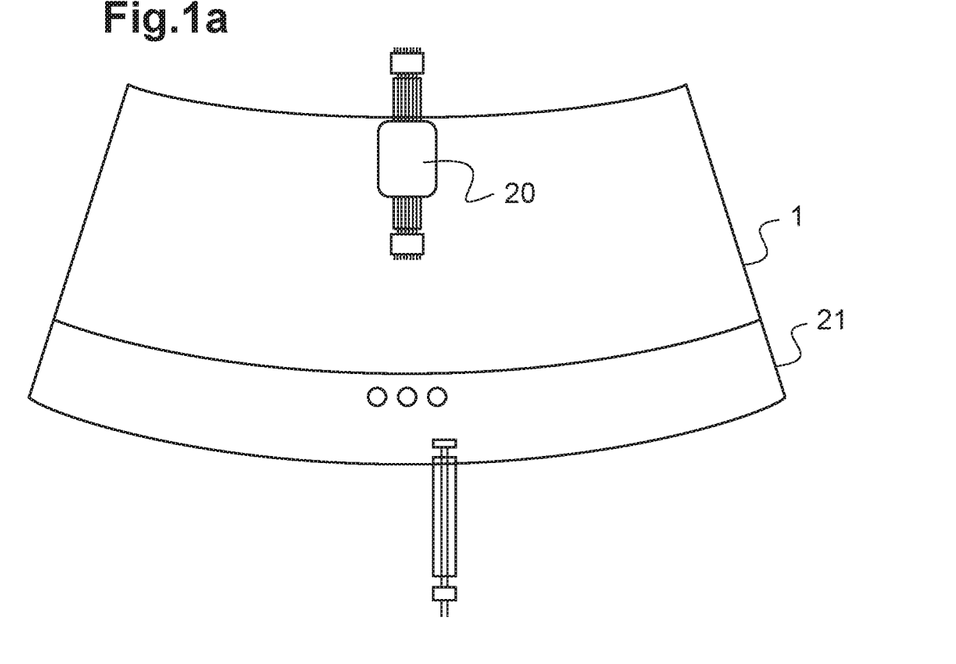
FIGS. 1a and 1b below are schematic front-on views of a motor-vehicle windshield equipped with the two components described above.
Figure 1B:
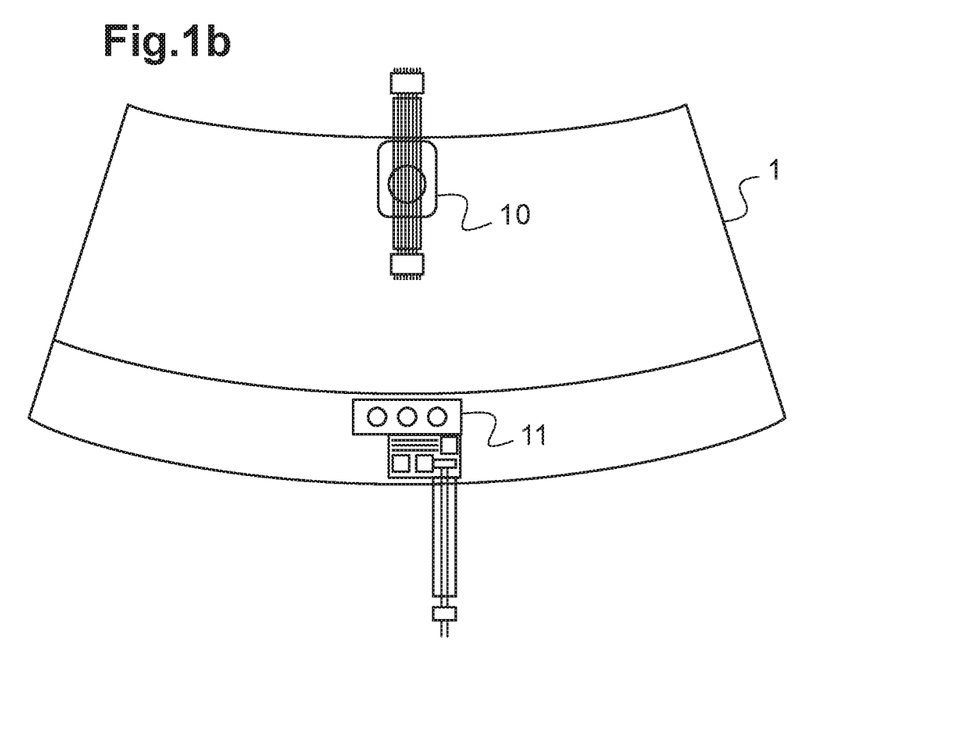

With reference to FIGS. 1a and 1b, overmolded components 10 and 11, respectively, are shown in a top and bottom position, respectively, on a motor-vehicle windshield 1.

FIG. 1.a shows the product such as it would appear to the driver of the vehicle. The screen-printed portions 20, 21 on face 4 of the windshield hide a portion of the overmolded components 10 and 11 from the sight of an occupant of the motor vehicle, but leave visible their useful portions seen from the passenger compartment of the vehicle. These screen-printed portions are artificially shown transparent in FIG. 1.b in order to allow the overmolded components 10 and 11 that are inserted between the glass sheets to be seen.

The overmolded component 10 is a cable strip that allows a video camera located in the interior of the vehicle to be connected to its processor, which is located elsewhere in the passenger compartment of the vehicle. It is in a top central position on the windshield and equipped with a connector at each of its two ends.

The overmolded component 11 is a set of three diodes located level with the bottom strip of the windshield, which may be used to signal particular driving conditions. The diodes and their control electronics are borne by a thin flexible printed circuit (FPC). The diodes, their control electronics and the FPC are connected to a cable strip equipped with a connector at its end.

Figures 2, 3:
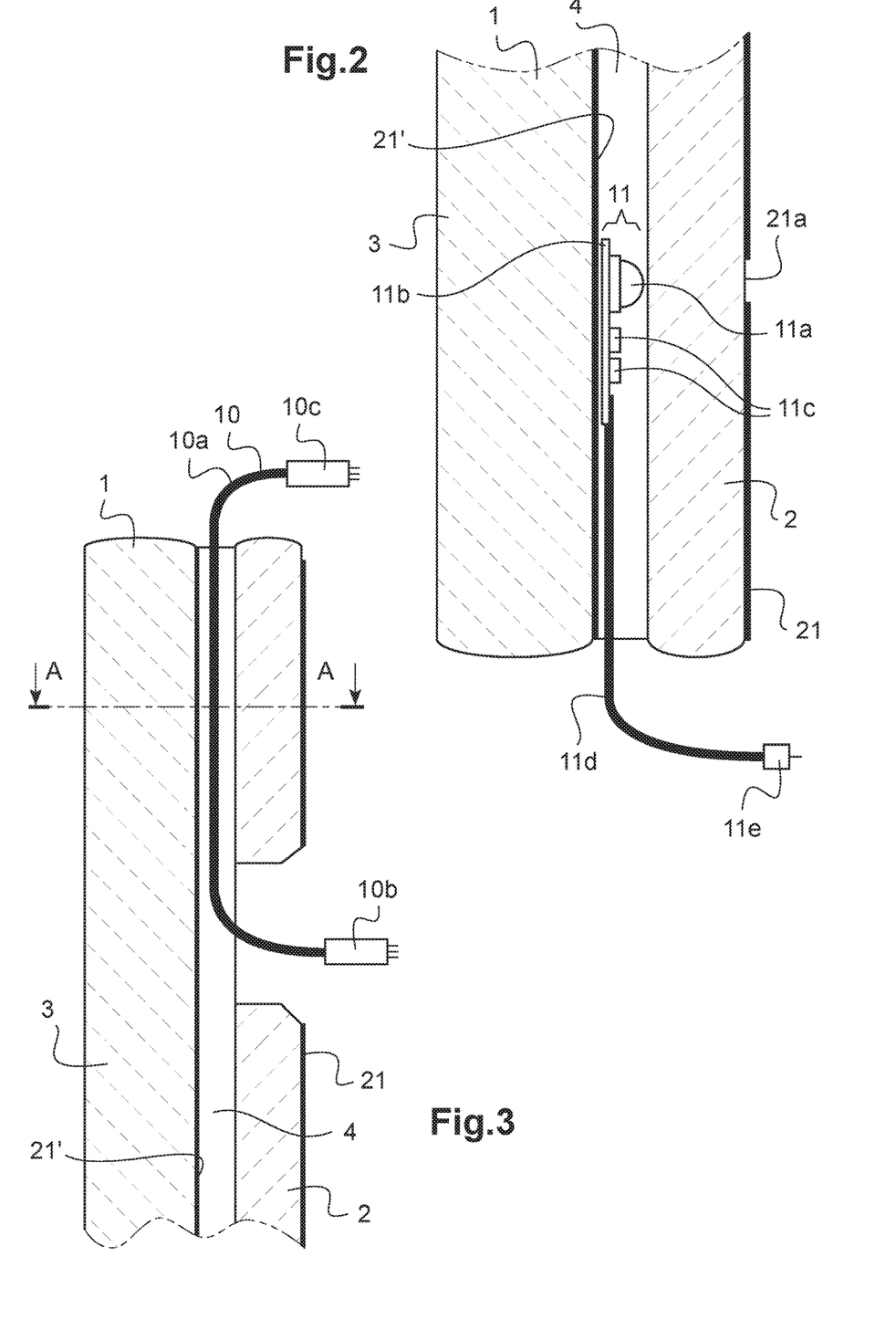
FIGS. 2 and 3 are detailed schematic cross-sectional views of that portion of the laminated glazing into which each of the two components is inserted.

FIGS. 2 and 3 illustrate in more detail the various components and the way in which they are inserted into the PVB.

FIG. 2 is a partial cross-sectional schematic representation of a windshield 1 comprising a light-emitting-diode (LED) component 11 that is placed level with the bottom strip of the glazing. The windshield 1 consists of an interior glass sheet 2 and an exterior glass sheet 3 that are joined together by a sheet of interlayer adhesive 4 (polyvinyl butyral -PVB-). The following may be seen: 1) the LED 11a, which is located facing an aperture 21a in the screen-print 21 on face 4 of the windshield, 2) the FPC 11b with electronic components 11c thereon and 3) the power-supply and control cable 11d, which exits the glazing 1 and which is equipped with a connector 11e. This cable 11d may enter into the interior of the passenger compartment in order to be connected to the electrical system of the vehicle. The windshield 1 moreover includes a screen-print 21' on face 2, the function of which is in particular to hide the adhesive bead bonding the windshield to the body opening, viewed from the exterior of the vehicle.

FIG. 3 is a partial schematic cross-sectional representation of a windshield 1 comprising a shielded cable 10 used to connect a video camera behind the rearview mirror. The following may be seen: the cable 10a itself, the lower connector 10b allowing the video camera in the interior of the vehicle to be connected, and the upper connector 10c allowing the controller of the video camera to be connected. The cable 10a may enter into the interior of the passenger compartment in order to be connected to the electrical system of the vehicle. The other components of the windshield 1 are the same as those already described with reference to FIG. 2.

Figure 4:
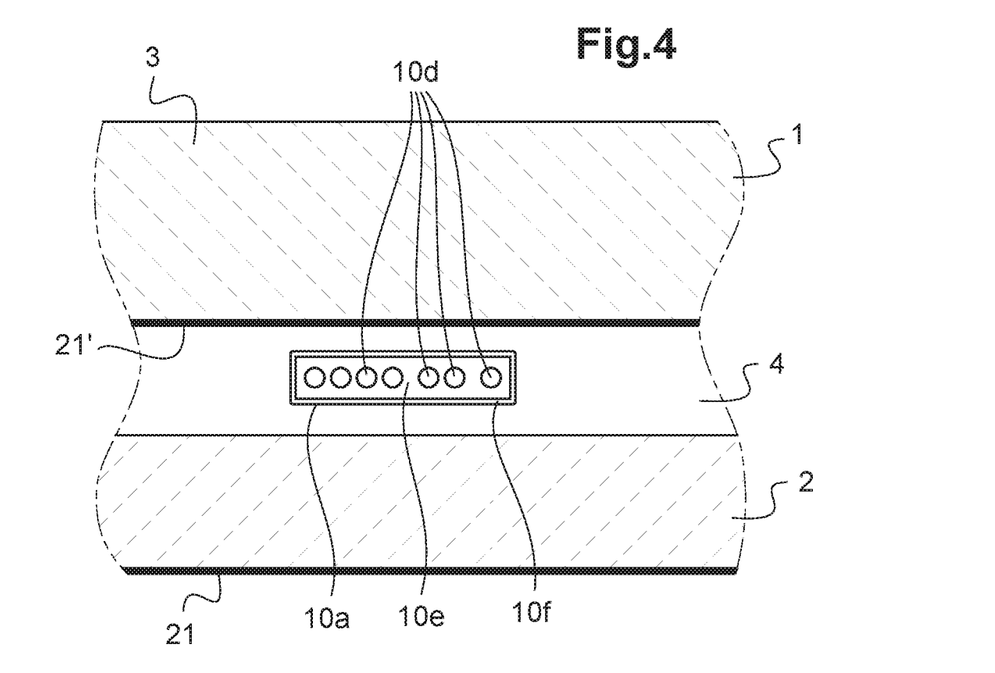
FIG. 4 schematically illustrates a section of FIG. 3 cut in the plane A-A.

FIG. 4 is a section of FIG. 3 cut in the plane A-A. The cable strip 10a connecting the video camera is made up of various types of conductors 10d. The function thereof will not be detailed here. The material 10e is an insulator and the material 10f is a shield.

Figure 5:
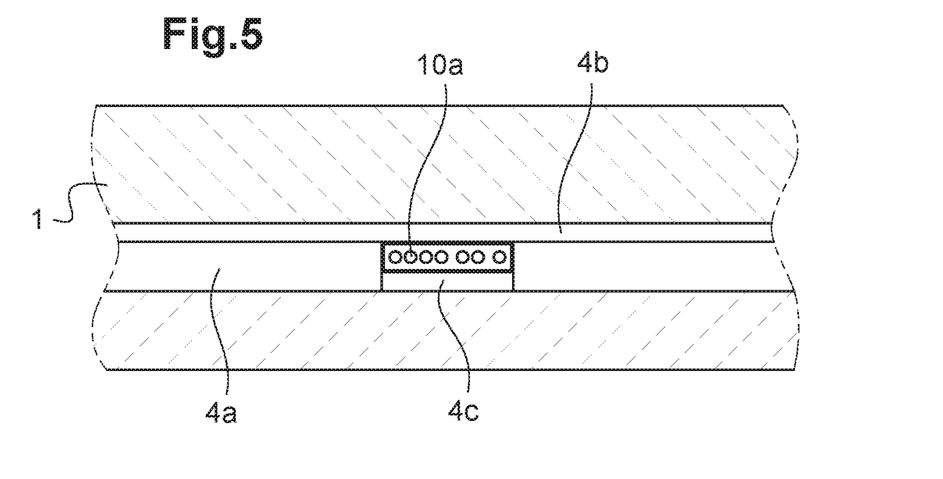
FIG. 5 schematically illustrates the prior-art process for inserting a component of thickness larger than 0.2 mm into a laminated glazing.

FIG. 5 shows the same view as FIG. 4 in order to illustrate a prior-art process for inserting the cable strip 10a into a laminated glazing 1. All of the reference numbers shown in FIG. 4 have not been reshown in so far as to do so would not aid with comprehension of the process.

A thick cable strip 10a of 0.4 mm thickness is inserted into the laminated windshield 1. Assembly is achieved by virtue of two PVB sheets 4a and 4b, respectively, of 0.76 and 0.38 mm thickness, respectively, which fit tightly around the cable strip 10a that is itself sandwiched between two sheets 4c and 4b of 0.38 mm of PVB.

Thus, at any point in the product, the apparent thickness of the compound PVB 4+cable strip 10a has a thickness of about 1.1 mm—this will allow most of the conventional problems mentioned above to be solved.

Next, during autoclaving, the PVB will be raised to a relatively high temperature (above 100° C.)—this will soften it and allow it to flow. A noteworthy effect is then observed, the interfaces between the various pieces of PVB will disappear, the PVB will so to speak scar in order to form after autoclaving only a uniform and continuous film of 1.1 mm thickness.

Once the autoclaving has ended, the product is perfectly transparent, only a slight optical distortion in transmission possibly appearing in the vicinity of the cable.

It is regrettable that other of the aforementioned problems, related to the multiplicity of PVB/PVB interfaces, for example the risk of a visual defect being created by trapping of dust inter alia, remain.

FIGS. 6a, 6b and 6c and 7a and 7b schematically show two overmolded components, a cable connecting a video camera and a component comprising light-emitting diodes (LEDs), respectively.

With reference to these figures, the components are overmolded in a PVB sheet of limited lateral dimensions and of simple, typically rectangular, geometry. The thickness of the overmolded component is equal to the thickness of the PVB sheet of the glazing product, most often 0.76 mm.

Figure 6A:
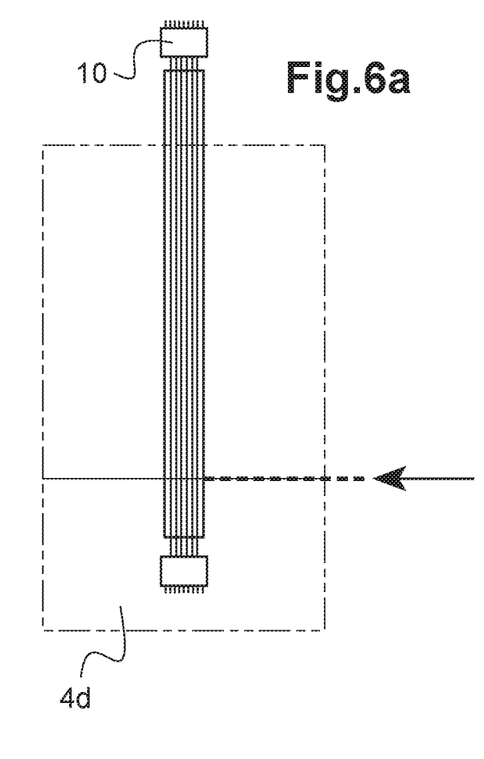
FIGS. 6a, 6b and 6c and 7a and 7b schematically show two overmolded components, a cable connecting a video camera and a component comprising light-emitting diodes (LEDs), respectively.
Figure 6B:
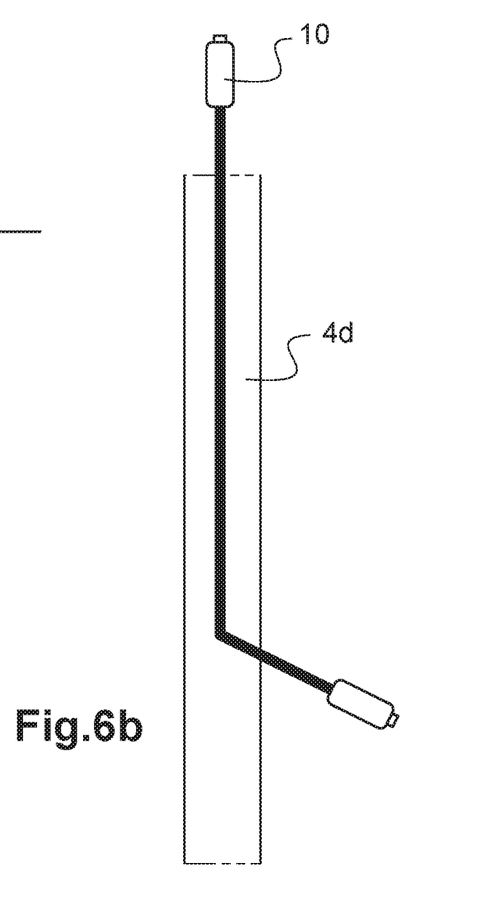

In FIG. 6a the overmolded component 10 for the "videocamera connection" application is shown face-on. The component 10 is a relatively thick cable, of thickness typically larger than 0.1 mm, and is equipped with a connector at each of its ends as was detailed above. As may be better seen in FIG. 6b (cross-sectional view) the cable enters into the PVB sheet 4d via the edge face of the latter, and the other end exits via the surface of the PVB sheet 4d, in order to pass through the glazing via a hole drilled in the interior glass (not shown here), as described with reference to FIG. 3. The arrow in FIG. 6a indicates the point where the component exits from the PVB sheet 4d.

Figure 6C:
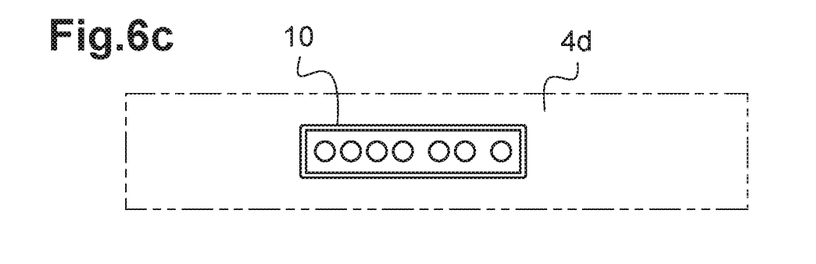

FIG. 6c shows a section of the overmolded component 10, which section is cut through the portion in which the cable is still embedded in the PVB sheet 4d.

Figures 7A, 7B:
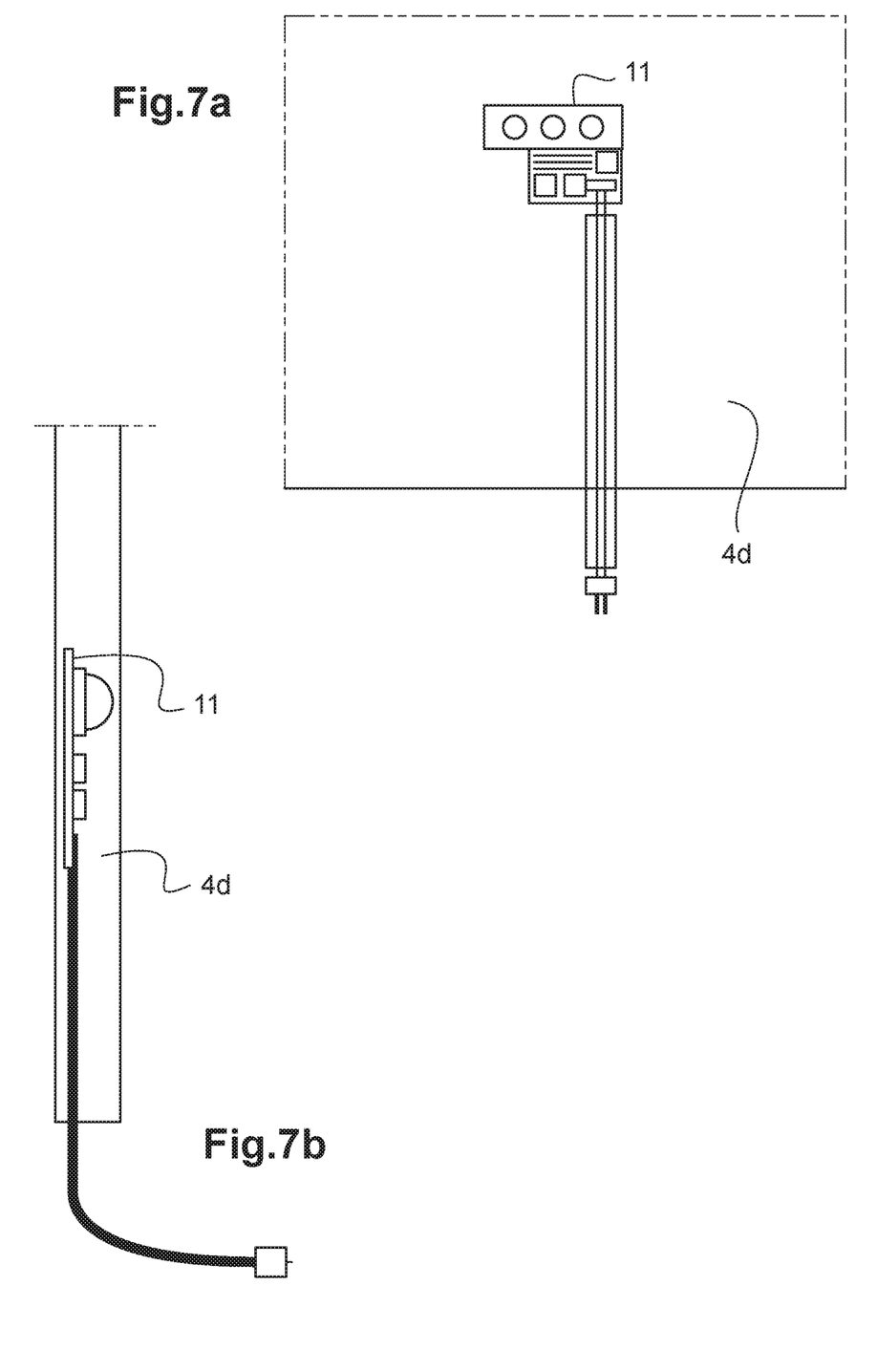

In FIG. 7a, the overmolded component 11 for the LED application is shown face-on. The component 11 is composed of an FPC with electronic components and LEDs fastened to its surface and of a cable equipped with a connector, as explained in more detail with reference to FIG. 2. All thereof is overmolded in a PVB sheet 4d of constant thickness, in general of 0.76 mm. The cable exits from the PVB sheet 4d via the edge face of the latter and extends therefrom on the exterior thereof, as may be better seen in FIG. 7b, which is a cross-sectional view. The end of the cable is equipped with a connector in order to be connectable to the electrical wiring of the vehicle.

Figure 8A:
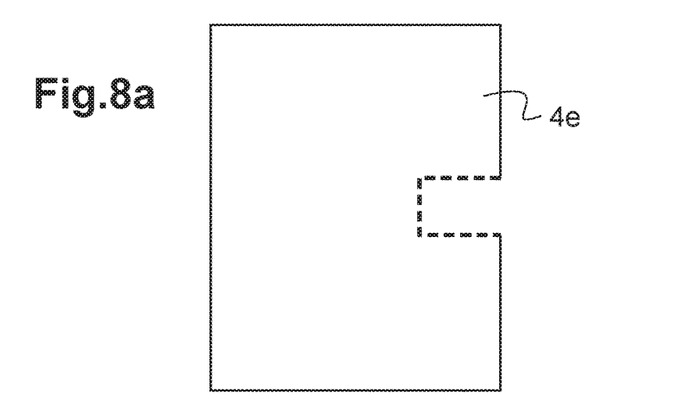

The process for assembling an overmolded component into a laminated glazing according to the invention is now more specifically described with reference to FIGS. 8a-i.

FIG. 8a shows the main PVB sheet 4e being prepared off-line by precutting therein a window intended to receive the overmolded component. To do this an automatic cutting system is used, this system being composed of a table and a blade borne by an orientable tool that is itself fastened to a system that allows horizontal movement (in X-Y), namely a carriage mounted on a bridge, allowing a PVB sheet to be cut locally. By combining the various movements, it is possible to make the blade follow any cutting path.

Figure 8B:
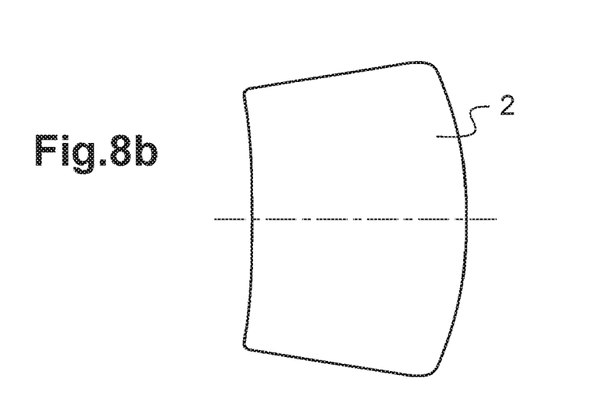

FIG. 8b shows the presentation of the clean interior glass 2 convex surface directed upwards. Alternatively, the clean exterior glass could be presented concave surface directed upwards.

Figure 8C:
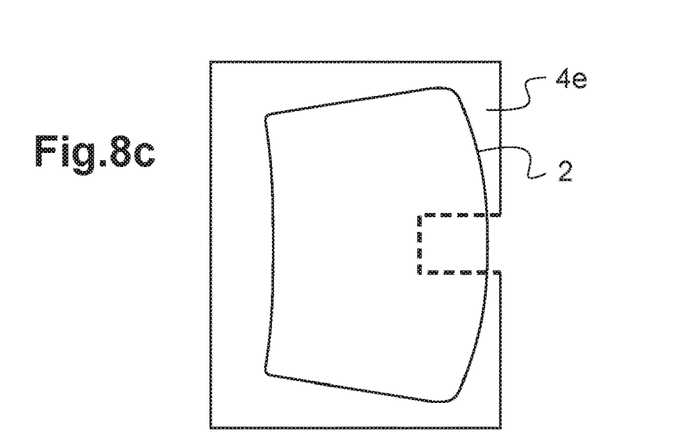

FIG. 8c shows the PVB sheet 4e that was cut beforehand (step 1) being put in place on the interior glass sheet 2 and the PVB sheet 4e being centered with respect to the interior glass 2.

Figure 8D:
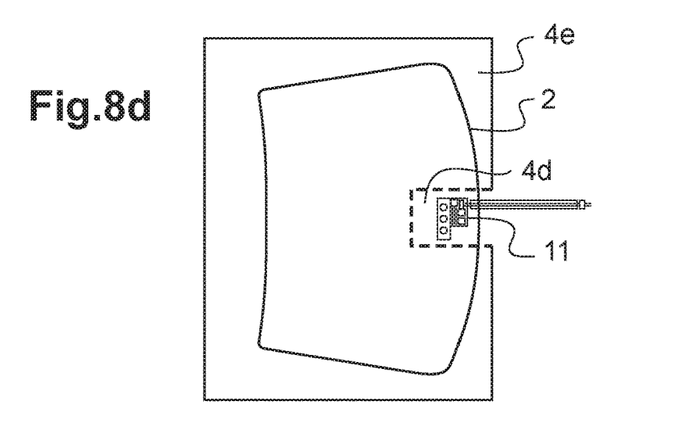

FIG. 8d shows the overmolded component 11, 4d being put in place in the interior of the window cut in the PVB sheet 4e in step 1.

Figure 8E:
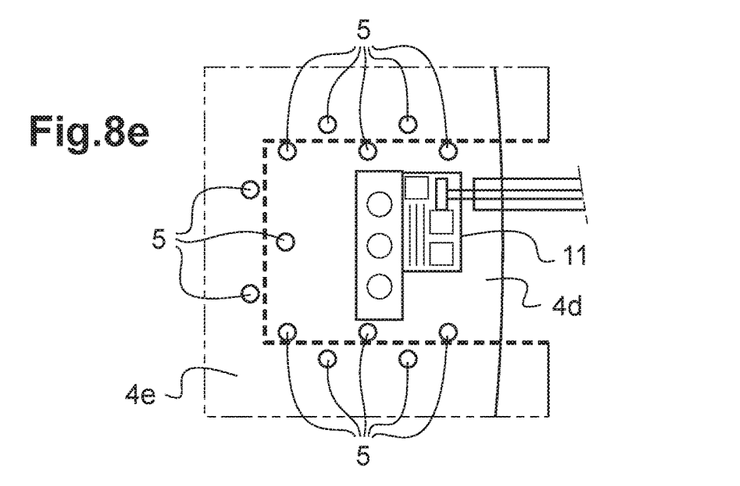
Figure 8F:
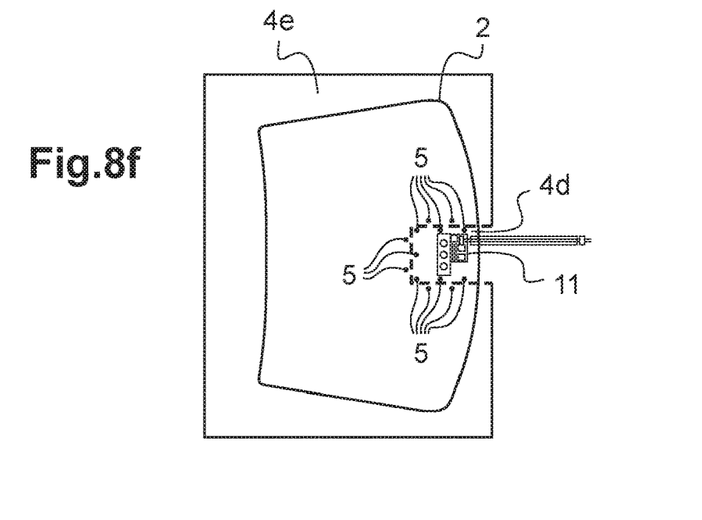

FIG. 8e shows the spot bonds 5 of the overmolded component 11, 4d and of the precut PVB sheet 4e to the interior glass 2 in the vicinity of the window in order that the sidewalls a) of the window cut in the PVB sheet 4e and b) of the overmolded component 11, 4d remain contiguous i.e. in good contact with each other. FIG. 8f is a zoomed-out view of FIG. 8e.

Figure 8G:
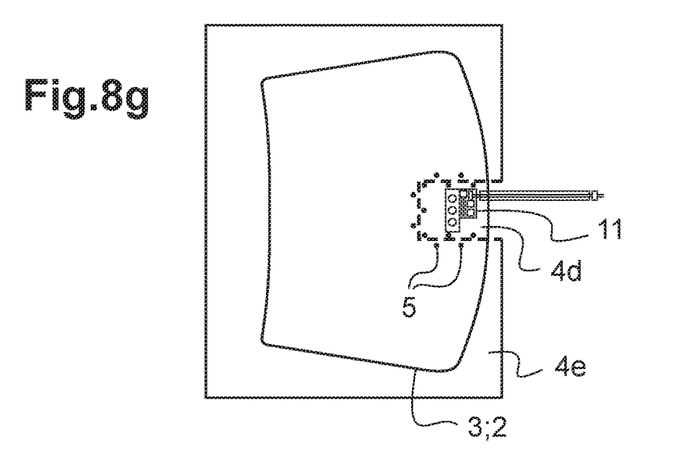

FIG. 8g shows the exterior glass 3 being put in place (deposited, centered) above the assembly made up of the interior glass 2+PVB sheet 4e+overmolded component 11, 4d, the latter two being fastened by spot bonds 5 to the interior glass 2.

Figure 8H:
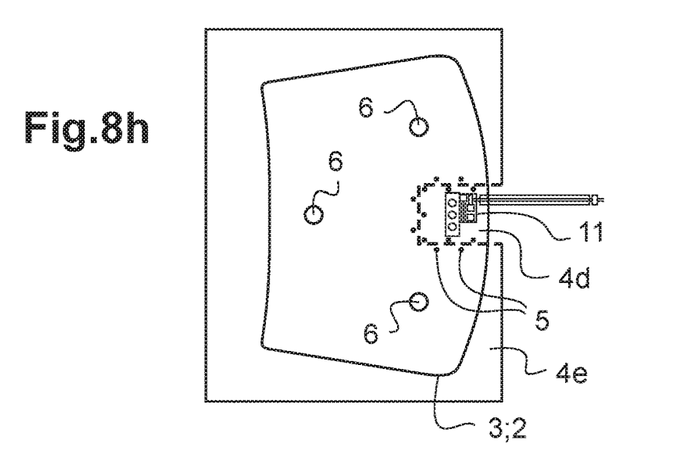

FIG. 8h shows the spot bonds 6 of the assembly thus obtained (interior glass 2+PVB sheet 4e+overmolded component 11, 4d+exterior glass 3), provided in order that the various components remain securely fastened to one another during the rest of the process.

Figure 8I:
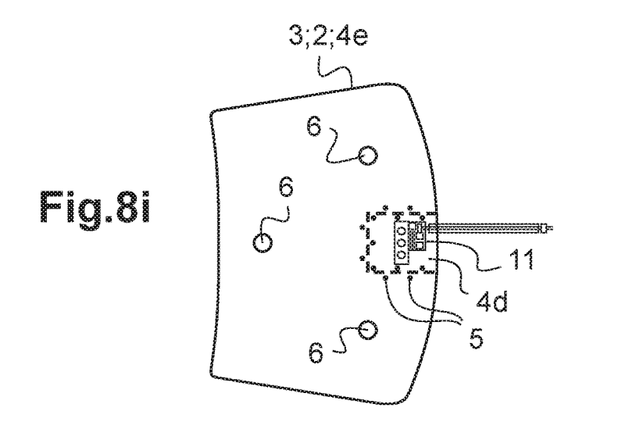

FIG. 8i shows the removal of excess PVB 4e from around the glazing by peripheral trimming with a knife for example. It is possible to eliminate this step if the step of cutting the window in the PVB 4e (FIG. 8a) is complemented with complete trimming of the sheet to the dimensions of the glazing.

Techniques for manufacturing the overmolded components will now be described.

Figure 9A:
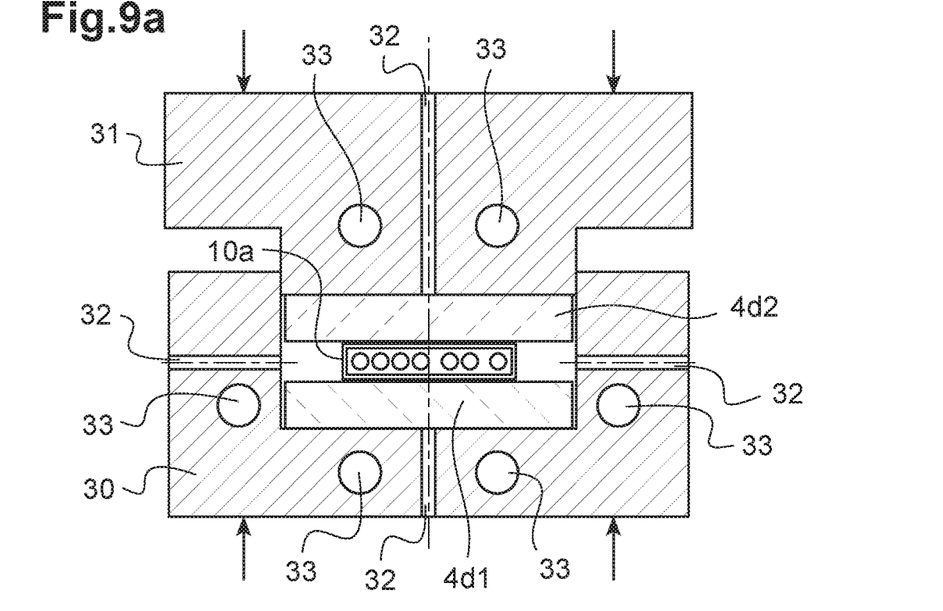
FIGS. 9a and 9b illustrate a section A-A and a top view of a technique for producing an overmolded component by pressing in a mold.
Figure 9B:
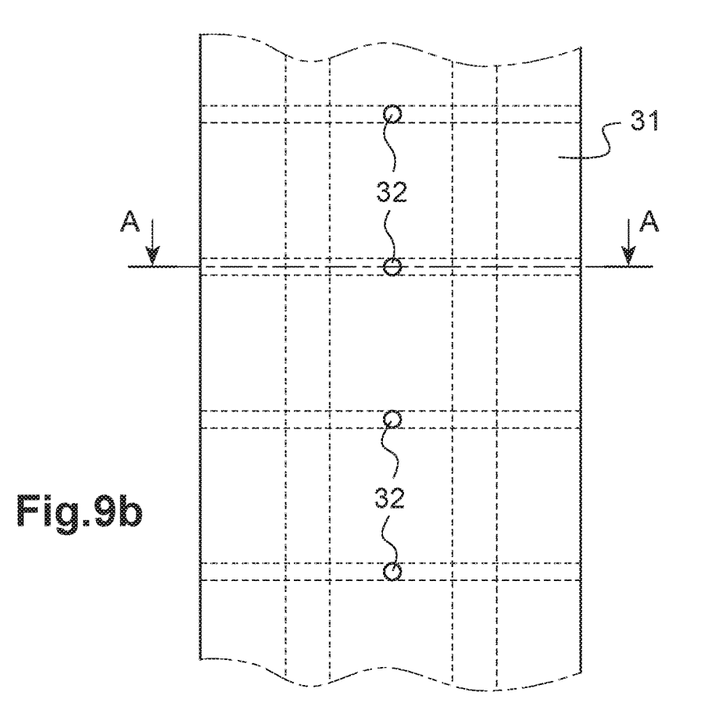

Various techniques may be used to overmold the components with PVB while controlling the thickness of the assembly. We will mention a few nonlimiting example embodiments. These examples are based on three different techniques: molding, extrusion or injection molding. These techniques or combinations of these techniques allow a suitable overmolding to be produced:

The molding technique: with reference to FIGS. 9a and 9b, one possible embodiment consists in using a mold made up of two complementary portions 30 and 31 and containing vents 32 and a heating circuit 33 through which oil flows, and then in stacking therein two PVB sheets 4d1 and 4d2 sandwiching the component to be overmolded, i.e. a cable strip 10a. The thicknesses of the PVB sheets 4d1 and 4d2 inserted into the mold are adjusted in order that the total volume of PVB is slightly in excess. Next, pressure is applied to each portion 30 and 31 of the mold in order to bring them closer together, then hot oil is made to flow through the heating circuit 33 in order to soften the PVB. The pressure between the two portions of the molds may be exerted via Belleville washers or indeed via a hydraulic or pneumatic force. The internal portions of the mold and the mold parting plane are coated with a Teflon coating in order to prevent the PVB from adhering to its walls.

When the PVB softens, it squashes under the effect of the pressure exerted between the two portions 30 and 31 of the mold and fills the spaces left free on either side of the component to be overmolded. After this operation, the slight excess of PVB fills the vents 32 provided in the mold. These vents 32 allow a slight excess of PVB to be used in the mold in order to be certain that all the gaps will be filled with PVB but also to ensure that this excess of material will be evacuated (via the vents 32) in order to ensure the overmolded component has a well-controlled thickness.

In case of trapped air bubbles, it is easy to introduce the mold into a vacuum chamber before the mold is heated.

The extrusion technique: another possible embodiment would consist in proceeding by way of an extrusion nozzle. A process in three steps could be envisioned: 1) a first PVB layer (4d1 in FIG. 9a) could be placed in the mold bottom (female portion 30 in FIG. 9a) using an extrusion nozzle, then 2) the component 10a would then be placed on this first PVB layer 4d1, lastly, 3) a second layer of PVB 4d2 in slight excess could be deposited on the 'first PVB layer 4d1+component 10a' assembly. In order to perfect the assembly, the assembly could be completed by placing under pressure a male mold portion 31 and then, as in the preceding process, a calibrated thickness could be ensured for the overmolded component. It is possible, more simply, to imagine not using a male mold 31 and to simply remove the excess PVB by passing a knife over the female portion of the mold. In case of trapped air bubbles, one improvement would consist in carrying out the extrusion in a vacuum chamber.

The injection-molding technique: another embodiment consists in directly injecting the PVB around the component. Two difficulties may be encountered with this technique: 1) it is firstly necessary for the component to be able to withstand the very high pressures encountered in the injection mold because of the high viscosity of the PVB, 2) the second difficulty is with holding the component in the injection mold so that it does not move during the delivery of the liquid polymer.

One advantageous combination would consist in providing a two-cavity mold as in the case of the mold detailed above, but the upper male portion 31 of which would be equipped with injection nozzles. The process would for example consist in inserting a first PVB sheet 4d1 that would fill the female portion of the mold then in fastening therein the component 10a to be inserted therein, for example by bonding (in a similar way to the technique that allows the overmolded component to be fastened to the interior glass FIG. 8e) then in closing the injection mold and then injecting the PVB.

The invention is advantageous in many ways:

Technique suitable for any component [of relatively small thickness]: the intermediate product [component overmolded with PVB taking the form of a sheet of well-defined thickness] may be manufactured with a multitude of components provided that one of its dimensions (its thickness) is small with respect to the others. Thus in the described cases, it will be possible to assemble the LED component in the same way as the shielded-cable component. It is possible to envision other products such as textiles, optionally based on optical fibers, allowing a large portion of the glazing or indeed a well-defined zone to be illuminated; sensors; RFID chips; etc.

In the case where the thickness of the component is larger than 0.76 mm (thickness of standard PVB), it is possible to envision manufacturing an overmolded component of 2×0.76 mm=1.52 mm and assembling it with two PVB sheets stacked one on top of the other.

Productive technique: on a production line, the objective is to be productive and not to create bottlenecks. It is clear that the prior-art method described above is not suitable for a production line. In contrast, the method presented in this invention disclosure is compatible. Specifically, the time lost with respect to the assembly of a standard componentless product consists in 1) placing the component in the precut window of the PVB sheet and 2) bonding the periphery of these two components to the exterior glass (as schematically shown in FIG. 8.e). This operation is compatible with the rate of a production line since a) it is possible to omit the operation in which the portion of the PVB sheet that protrudes from the glazing is trimmed by including this trimming operation in the same cycle as the one used to cut the window in the PVB sheet and b) it is possible to construct a tool that allows the various spot bonds to be produced in a single operation.

Little scrappage for reasons of quality: compared to the aforementioned prior art, the technique of the overmolded component minimizes the number of PVB sheets and their interfaces, thus decreasing the probability of trapping dust or fibers that would lead to products being scrapped for reasons of visual defects once said products had reached complete transparency at the end of the assembly operation (degassing, edge sealing, autoclaving).

Lastly, the PVB sheets make lateral contact on only three sides, this minimizing the risk of bubbling during the assembly operation.

The invention claimed is:

1. A process for assembling a laminated glazing comprising an overmolded component, the process comprising:
    preparing a main sheet of interlayer adhesive by precutting therein a window intended to receive the overmolded component;
    presenting a first sheet of clean glass;
    putting the precut sheet of adhesive in place on the first glass sheet and centering the sheet of adhesive with respect to the first glass sheet;
    putting the overmolded component in place in an interior of the window cut in the precut sheet of adhesive, or conversely first putting the overmolded component in place, then the precut sheet of adhesive on the first glass sheet;
    spot bonding the overmolded component and the precut sheet of adhesive to the first glass sheet in the vicinity of the window in order that sidewalls a) of the window cut in the sheet of adhesive and b) of the overmolded component remain in contact with each other, wherein the spot bonding includes forming a first plurality of spaced apart spot bonds exclusively along a periphery of the window inside said window and forming a second plurality of spaced apart spot bonds exclusively along said periphery of the window outside said window;
    putting a second clean glass sheet in place above an assembly made up of the first glass sheet, the precut sheet of adhesive and the overmolded component, the precut sheet of adhesive and the overmolded component being fastened by the spot bonds to the first glass sheet;
    optionally spot bonding an assembly thus obtained in order that the first glass sheet, the second glass sheet, the overmolded component and the precut sheet of adhesive remain securely fastened to one another during the rest of the process;
    removing an excess adhesive from around the glazing, unless the removing operation was performed when the window was precut in the sheet of adhesive; and
    assembling the laminated glazing by implementing suitable temperatures and pressures.

2. The process as claimed in claim 1, wherein the first glass sheet is curved and has a convex surface and the second glass sheet is curved such that the glazing is curved, and wherein the first glass sheet is an interior sheet and presented with the convex surface directed upwards; the second glass sheet being an exterior sheet.

3. The process as claimed in claim 1, wherein the first glass sheet is curved and has a concave surface and the second glass sheet is curved such that the glazing is curved, and wherein the first glass sheet is an exterior sheet and presented with the concave surface directed upwards; the second glass sheet being an interior sheet.

4. The process as claimed in claim 1, wherein the overmolded component is manufactured by pressing the component between two sheets of interlayer adhesive in a mold equipped with a heater.

5. The process as claimed in claim 1, wherein the overmolded component is manufactured by extruding a first sheet of interlayer adhesive, placing the component on the first sheet of interlayer adhesive and extruding a second sheet of interlayer adhesive onto the component.

6. The process as claimed in claim 1, wherein the overmolded component is manufactured by injection molding interlayer adhesive around the component.

7. The process as claimed in claim 1, wherein the main sheet of interlayer adhesive and the overmolding of the overmolded component comprise an acoustic lamination interlayer.

8. The process as claimed in claim 1, wherein all or some of the area of the main sheet of interlayer adhesive and of the overmolding of the overmolded component is tinted.

9. The process as claimed in claim 1, wherein the excess adhesive is removed from around the glazing by trimming with a knife.

10. The process as claimed in claim 1, wherein the overmolded component is a set of diodes and control electronics, which are borne by a thin flexible printed circuit and connected to a cable strip equipped with a connector at an end of the cable strip, the method further comprising forming, on an interior face of the glazing, a first enamel layer deposited on an external face of the second glass sheet, said first enamel layer containing apertures facing each diode in order to let pass light to be emitted by the diodes, and forming a second enamel layer, on another face of the glazing, to hide an assembly made up of the set of diodes, the flexible printed circuit and the cable strip from an exterior side of the glazing.

* * * * *